United States Patent Office 2,899,414
Patented Aug. 11, 1959

2,899,414

POLYMERIZATION OF OLEFINS WHILE SUBJECTING THE CATALYST TO ULTRASONIC WAVES

Thomas S. Mertes, Wilmington, Del., assignor to Sun Oil Company, Philadelphia, Pa., a corporation of New Jersey No Drawing. Application February 26, 1957
Serial No. 642,330

12 Claims. (Cl. 260—93.7)

This invention relates to a process for the polymerization of olefins and particularly relates to a process for the preparation of solid polymers of ethylene, solid polymers of propylene, and solid copolymers of ethylene and propylene, and to a method for the regeneration of solid catalysts used in processes for preparing such solid polymers of normally gaseous olefins.

Processes using solid catalytic materials for the preparation of polyethylene or polypropylene, by which is meant the polymers of ethylene or propylene which are solid at room temperature, have heretofore been described. Such processes generally involve contacting the olefin, usually dissolved in a solvent, with the solid catalyst under polymerizing conditions. Batch or continuous operation may be used. In such processes, polymers of widely varying molecular weights are produced, including some relatively high molecular weight, resinous polymers. A portion of such polymers are dispersed in the reaction medium, but the remainder deposits on and deactivates the catalyst. This deposition prevents continuous operation for substantial periods of time without catalyst regeneration. Catalyst regeneration is difficult and usually requires intensive solvent treatment, and even with such treatment, complete success in regenerating the catalyst and in recovering, as useful products, the deposited resinous polymer are not achieved. Generally some relatively low molecular weight polymers, i.e., polymers having a molecular weight below about 10,000, are also obtained, and such polymers are considered unsuitable for recycling to or reuse in the process, since they appear inactive and are not converted to the desired relatively high molecular weight polymers in the process.

An object of the present invention is to provide a process for the preparation of solid polymers of normally gaseous olefins. Another object is to provide a process for the preparation of solid polymers of ethylene or propylene having relatively uniform molecular weights. A further object is to provide a process for the preparation of solid polymers of olefins using solid catalysts wherein catalyst activity is maintained over long periods of operation. A still further object is to provide a process for the regeneration of a solid catalyst deactivated by solid polymers of a normally gaseous olefin. An additional object is to provide a process for the preparation of solid polymers of ethylene wherein relatively low molecular weight polymers of ethylene are used as feed materials.

It has now been found that if a polymerization zone being used to prepare polyethylene or polypropylene by contacting ethylene or propylene, or a mixture thereof, with a solid catalyst under polymerizing conditions be subjected to the effect of ultrasonic waves, as hereinafter described, solid polymers of substantially uniform molecular weights are obtained and the catalyst can be used for relatively long intervals without the necessity of regeneration. It has also been found that a catalyst deactivated by adhering resinous polymers can be rapidly and economically regenerated by subjecting an admixture of the deactivated catalyst and a solvent to the effect of ultrasonic waves, as hereinafter described. It has been further found that low molecular weight polymers of ethylene can be converted into suitable feed materials by subjection to the influence of ultrasonic waves, either prior to or in the polymerization process, also as hereinafter described.

For convenience, the process of the invention is hereinafter principally discussed using ethylene as the normally gaseous olefin, it being understood that propylene, or mixtures of ethylene and propylene, can be used.

In an embodiment of the process, ethylene dissolved in a solvent is continuously passed, under polymerizing conditions, through or into a polymerization zone in contact with a solid catalyst. During the process, the reaction zone is subjected to the effect of ultrasonic waves. The solvent containing polymers of ethylene, which may be dissolved, dispersed or both dissolved and dispersed, is removed from the reaction vessel and the polymers recovered, such as by filtering, evaporating the solvent, or the like.

In a slurry type operation wherein ethylene is contacted, in a polymerization zone, with catalyst dispersed in a solvent and wherein the reaction zone is subjected to ultrasonic waves, the effluent from the polymerization zone contains the dispersed catalyst and polyethylene. The polyethylene may be dissolved, dispersed, or both dissolved and dispersed in the reaction medium. Polyethylene can be readily recovered from the reaction medium, also designated herein as solvent, and the dispersed catalyst recycled to the process. In a batch type operation wherein ethylene is introduced into a polymerization zone containing a solid catalyst dispersed in a solvent for ethylene, and wherein the polymerization zone is subjected to ultrasonic waves, on completing the reaction recovery of polyethylene and catalyst can be accomplished in substantially the same manner as above mentioned. In both slurry and batch operations, it appears that the formation of relatively high molecular weight resinous polymers which adhere to and deactivate the catalyst is prevented so that the catalyst can be recycled or reused in the process without regeneration. It also appears that the polymers of ethylene have substantially uniform molecular weights which makes the products of the invention especially suitable for specific applications without resort to separation means.

The above considerations are also applicable to fixed bed type operations wherein a solid catalyst, preferably in pellet form, is maintained in a polymerization zone and ethylene dissolved in a solvent continuously contacted therewith under polymerizing conditions. In accordance with the invention, the polymerization zone is subjected to ultrasonic waves during the process. As has been found, the polymers produced have substantially uniform molecular weights and, instead of adhering to and deactivating the catalyst, are dispersed in the reaction medium and are therein removed from the process. Only after long operation is catalyst regeneration necessary.

In another embodiment of the invention, ethylene in liquid or gas phase, or dissolved in a solvent, is contacted with a solid polymerization catalyst under polymerizing conditions but in the absence of ultrasonic waves. When the catalyst becomes deactivated, it is removed from the reaction, admixed with a solvent for polyethylene, and the resulting admixture subjected to the effect of ultrasonic waves, preferably at an elevated temperature. The solid polymers of ethylene, under these conditions, appear to be converted to lower molecular weight polymers which are soluble in the solvent, and are hence readily removed from the catalyst. The polyethylene is readily recoverable from the solvent and are useful products.

In a further embodiment of the invention, relatively low molecular weight polymers such as are prepared in prior processes and which appear as liquids or soft, grease-like solids, are made suitable as feed materials for the preparation of polyethylene by subjection to ultrasonic waves, preferably while dissolved or dispersed in a solvent and preferably immediately prior to their introduction, together with ethylene, to a polymerization zone. Such polymers, together with ethylene, can be introduced directly into a polymerization zone which is maintained under the influence of ultrasonic waves in accordance with the polymerization process of the invention, and good results obtained.

Solid catalysts which can be employed in the process of the invention which are especially suitable for preparing polyethylene, and which can be regenerated in accordance with the invention, are those which are known to convert ethylene to solid polymers thereof, such as nickel, cobalt, or mixtures of nickel and cobalt on activated carbon, alumina, silica, or the like, with or without a promoter, such as an oxide of copper, silver, iron, or the like. Molybdenum oxide deposited on alumina, titania, zirconia, or the like, also give good results, as do chromium oxide deposited on alumina, silica, zirconium oxide or thorium oxide.

Propylene can be polymerized in the process of the invention by a variety of catalysts. A catalyst which is especially effective for the polymerization of propylene to relatively high molecular weight solid polymers is the combination of a lower halide of titanium, such as titanium trichloride and an aluminum trialkyl, such as aluminum triethyl. This catalyst can be prepared by admixing, for example, titanium tetrachloride and aluminum triethyl in an inert solvent such as isooctane. On admixing the two components, a finely divided solid phase is formed as a dispersion in the inert solvent. This dispersion acts as a catalyst for polymerizing propylene to solid polymers. If desired, a lower halide such as titanium trichloride can be preformed, dispersed in an inert liquid, and an activator such as an aluminum trialkyl added. This solid phase acts as a catalyst for polymerizing propylene to solid polymers. In performing the polymerization step propylene is contacted with the solid catalyst, such as by passing the olefin through a suspension of the finely divided solid in the inert liquid reaction medium, and is thereby polymerized to solid polymers. Other halides and salts of the metals of groups IV, V and VI of the periodic table can be employed. Preferably a halide or salt of titanium, zirconium, hafnium, vanadium, niobium, chromium, molybdenum or tungsten is used. The metal of the metal compound must be in a valence other than its highest valence state. The reduction of a metal compound such as titanium tetrachloride can be accomplished by any convenient means. As above described, an aluminum trialkyl can be used as the reducing agent, or other reducing means such as by contacting the metal compound with a dispersion of an alkali metal in an inert solvent can be used. It is necessary, however, that an activator such as an aluminum trialkyl be present as a component of the catalyst, and it is convenient in many instances to employ such a compound as both the reducing agent and the activator. However, the use of a prereduced compound, such as TiCl$_3$ or TiCl$_2$, together with an activator, gives excellent results. Materials which can be used as the activator, in addition to aluminum trialkyls, include other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like. The quantities of these catalytic components can be varied and good results obtained. A mole ratio of metal compound to activator of from 1:10 to 10:1 gives good results when the metal compound is prereduced or is reduced by the activator. The total quantities used are preferably such that a light slurry of the solid phase in the inert, liquid reaction medium which can be easily agitated is obtained. Generally from 1 part of catalyst particles to from 30 to 1,000 or more parts of the inert reaction medium gives good results.

In general, reaction conditions heretofore described as suitable for the polymerization of ethylene can be used and such conditions are herein conveniently designated as "polymerizing conditions." Such conditions generally include the temperature of from about 0° C. to 350° C. and preferably from 50° C. to 200° C., and pressures of from atmospheric to 3,000 atmospheres or more.

Solvents for the olefin which can be used as the reaction medium include, for example, the paraffinic hydrocarbons, such as the hexanes, heptanes, octanes, nonanes, decanes, mixtures thereof and the like, the cycloparaffins, such as cyclohexane, methylcyclopentane, decalin, and mixtures thereof with each other and with paraffins, and the like. Aromatic hydrocarbons such as benzene, toluene, ethylbenzene, xylenes, mixtures thereof, and the like, can also be employed in some instances with good results.

By "ultrasonic waves," as used herein, is meant the vibratory waves of a frequency above the limit of the human ear and particularly refers to frequencies of from about 100 to 500 kc./s. (kilocycles per second). The power input required for the process varies from about 4 to 20 w./cm.$^2$ (watts per square centimeter). Preferably a frequency of from about 250 to 375 kc./s. with a power intensity in the range of from about 4 to 10 w./cm.$^2$ is used. The conversion of energy into ultrasonic waves by use of transducers is well known. By the term "transducer," as used herein, is meant means for converting energy into ultrasonic waves within the limits herein described. Means which utilize the piezoelectric effect, e.g., as exhibited by quartz or barium titanate, give good results and are preferred, but other means can be used if desired. It is believed that the ultrasonic waves employed in the processes of the invention produce cavitation throughout the reaction zone, and especially adjacent the catalyst particles, and that cavitation prevents the formation of relatively high molecular weight resinous polymers or reduces the molecular weight of polymers of high molecular weight. Cavitation is also believed to prevent severe adherence of polyethylene to the solid catalyst particles, and if already formed, to assist in removing such adhering polyethylene.

Although the invention is directed to the polymerization of normally gaseous olefins, small amounts of other olefins, say up to about 25% by weight of the normally gaseous olefin, can be present. For example, olefins such as butene-1, butadiene, styrene, and the like can be present and good results obtained.

The following examples illustrate embodiments of the invention:

*Example 1*

A catalyst containing 5% by weight chromium oxide on a silica-alumina base is prepared, as known to the art, by impregnating coprecipitated silica-alumina with an aqueous solution of chromium nitrate. The silica-alumina contains about 90% silica and 10% alumina. The concentration of the chromium nitrate solution and quantity used is adjusted so that the quantity of chromium oxide is 5% by weight of the final composition. The impregnated silica-alumina is heated to convert the nitrate to chromium oxide with at least part of the chromium in the hexavalent state.

The resulting catalyst is introduced into a polymerization zone adjacent a quartz transducer. Ethylene dissolved in a mixture of paraffinic hydrocarbons having from 6 to 9 carbon atoms per molecule is continuously passed through the polymerization zone under polymerizing conditions, the temperature being maintained at about 60° C. and the pressure at about 14 atmospheres. During the process, the transducer is operated using a frequency of 300 kc./s. and a power of 10 w./cm.$^2$. The space velocity is maintained at about 4 volumes of liquid per volume of catalyst per hour.

Polyethylene appears in the polymerization zone effluent as a white dispersion, and is recovered by filtration.

On discontinuing the generation of ultrasonic waves, the polymerization zone rapidly plugs due to accumulation of polyethylene on the catalyst, whereas with continued generation of the ultrasonic waves, such plugging is not observed.

*Example 2*

The catalyst of Example 1, after deactivation by adhering, resinous polymers of ethylene, is removed from the reaction zone and divided into two equal parts. To one part is added about 100 parts by weight of isooctane. The resulting mixture is agitated for about 4 hours at a temperature of about 150° C. and a pressure sufficient to maintain liquid phase. The isooctane containing dissolved polyethylene is then separated. While a portion of the polyethylene is removed, the activity of the catalyst is only partially restored.

To the other portion of deactivated catalyst is added the same quantity of isooctane and the regenerating is performed in the same manner and under the same conditions as before except that the system is subjected to the effect of ultrasonic waves of 200 kc./s. and a power of 5 w./cm.$^2$. After about 1½ hours the isooctane containing dissolved polyethylene is separated. The activity of the catalyst is substantially restored to its initial value.

The quantity of polyethylene recoverable by evaporation of the isooctane solvent in the above regenerations indicates that use of ultrasonic waves causes the dissolution of a substantially greater quantity of polyethylene, and the properties of the recovered polyethylene show the waves cause a decrease in the molecular weight of the polyethylene during the regeneration.

*Example 3*

A reactor bounding a polymerization zone is charged with about 70 parts by weight of a xylene mixture and 1 part by weight of a finely divided catalyst consisting essentially of molybdenum oxide, with the molybdenum in the hexavalent state, deposited on gamma-alumina. Ethylene is injected into the polymerization zone to produce a pressure of about 12 atmospheres. During the ethylene addition the polymerization zone is continuously subjected to ultrasonic waves of a frequency of 300 kc./s. and a power of 10 w./cm.$^2$. The pressure is maintained by intermittent injection of additional quantities of ethylene. The process is continued for about ½ hour and yields about 8 parts of solid polyethylene having a density of about 0.922 at 20° C.

*Example 4*

Particles of titanium trichloride were introduced into n-heptane contained in a reactor to form a slurry, 1 part of titanium trichloride being used and the concentration thereof being 0.02 part per 100 cc. of the reaction medium. 0.46 part of aluminum triethyl was then added to the slurry. The temperature of the slurry was adjusted to 90.6° C. and propylene was introduced into the reactor to a pressure of 100 p.s.i.g. The reaction mixture was agitated for 15.3 hours during which time the temperature was maintained at substantially 90.6° C. and the pressure at substantially 100 p.s.i.g. by periodically introducing propylene into the reactor. After 15.3 hours, alcohol was introduced into the reactor and the solid product washed with an alcoholic solution of nitric acid. There were obtained 529 parts of solid polypropylene having a molecular weight of about 155,000. There were obtained 360 parts of polymer per part of catalyst (titanium trichloride plus aluminum triethyl) used.

Repeating the foregoing procedure except that during the polymerization, the polymerization zone is subjected to ultrasonic waves of a frequency of 300 kc./s. and a power of 10 w./cm.$^2$, there is obtained an increased quantity of polymer, the increase being such that above about 420 parts of polymer are obtained for each part of catalyst used.

The foregoing examples illustrate embodiments of the invention. When other solid catalysts and/or other operating conditions are used within the hereindefined limits, substantially similar results are obtained.

The polymers prepared in accordance with the process of the invention are especially useful for the preparation of molded articles, transparent films, containers for corrosive liquids, and the like. The polymers of the invention are especially useful since the polymers obtained have substantially uniform molecular weights, and hence separation to remove relatively high or relatively low molecular weight polymers is not necessary.

This application is a continuation-in-part of U.S. application Serial Number 576,777, filed April 9, 1956, now abandoned.

The invention claimed is:

1. Process for preparing solid polymers of normally gaseous olefins which comprises contacting a material selected from the group consisting of ethylene, propylene, and mixtures of ethylene and propylene with a solid polymerization catalyst while subjecting the catalyst to the effect of ultrasonic waves.

2. Process for preparing solid polymers of ethylene which comprises contacting ethylene, in liquid phase and under polymerizing conditions, with a solid ethylene polymerization catalyst while simultaneously subjecting the polymerization zone to the effect of ultrasonic waves.

3. Process for preparing solid polymers of ethylene which comprises contacting ethylene, in liquid phase and under polymerizing conditions, with a solid ethylene polymerization catalyst while simultaneously subjecting the polymerization zone to the effect of ultrasonic waves having a frequency of from about 100 to 500 kc./s. and a power of from about 4 to 20 w./cm.$^2$.

4. Process according to claim 3 wherein said catalyst consists essentially of chromium oxide on a carrier material.

5. Process according to claim 3 wherein said catalyst consists essentially of molybdenum oxide on a carrier material.

6. Process for preparing solid polymers of ethylene which comprises contacting ethylene, in liquid phase and under polymerizing conditions, with a solid ethylene polymerization catalyst while simultaneously subjecting the polymerization zone to the effect of ultrasonic waves having a frequency of from about 100 to 500 kc./s. and a power of from about 4 to 20 w./cm.$^2$, and recovering polyethylene having a substantially uniform molecular weight from the reaction mixture.

7. Process for preparing solid polymers of ethylene which comprises contacting a mixture of ethylene and relatively low molecular weight polymers of ethylene with a solid ethylene polymerization catalyst while subjecting the catalyst to the effect of ultrasonic waves.

8. Process for preparing solid polymers of propylene which comprises contacting propylene, in liquid phase and under polymerizing conditions, with a solid propylene polymerization catalyst while simultaneously subjecting the polymerization zone to the effect of ultrasonic waves.

9. Process for preparing solid polymers of propylene which comprises contacting propylene, in liquid phase and under polymerizing conditions, with a solid propylene polymerization catalyst while simultaneously subjecting the polymerization zone to the effect of ultrasonic waves having a frequency of from about 100 to 500 kc./s. and a power of from about 4 to 20 w./cm.$^2$.

10. Process according to claim 9 wherein said catalyst is selected from the group consisting of the halides and salts of titanium, zirconium, hafnium, vanadium, niobium, chromium, molybdenum and tungsten, wherein the metal of the selected material is in a valence state other than its highest valence state.

11. Process according to claim 9 wherein said catalyst is titanium trichloride.

12. Process for preparing solid polymers of propylene which comprises contacting propylene, in liquid phase and under polymerizing conditions, with a solid propylene polymerization catalyst while simultaneously subjecting the polymerization zone to the effect of ultrasonic waves having a frequency of from about 100 to 500 kc./s. and a power of from about 4 to 20 w./cm.$^2$, and recovering polypropylene having a substantially uniform molecular weight from the reaction mixture.

References Cited in the file of this patent

UNITED STATES PATENTS

| | | |
|---|---|---|
| 2,445,970 | Reinhardt | July 27, 1948 |
| 2,578,377 | Smith | Dec. 11, 1951 |
| 2,606,174 | Kolthoff et al. | Aug. 5, 1952 |
| 2,731,452 | Field et al. | Jan. 17, 1956 |
| 2,742,408 | La Porte | Apr. 17, 1956 |